United States Patent [19]

Kiuchi et al.

[11] Patent Number: 4,593,373

[45] Date of Patent: Jun. 3, 1986

[54] METHOD AND APPARATUS FOR PRODUCING N-BIT OUTPUTS FROM AN M-BIT MICROCOMPUTER

[75] Inventors: Akihiro Kiuchi, Tenri; Shinichi Tanaka, Kashihara, both of Japan

[73] Assignee: Sharp Kabushiki Kaisha, Osaka, Japan

[21] Appl. No.: 521,559

[22] Filed: Aug. 9, 1983

[30] Foreign Application Priority Data

Aug. 9, 1982 [JP] Japan ............................. 57-138715

[51] Int. Cl.[4] .............................................. G06F 13/00
[52] U.S. Cl. ..................................... 364/736; 364/900
[58] Field of Search ...................... 364/736, 200, 900

[56] References Cited

U.S. PATENT DOCUMENTS

| | | | |
|---|---|---|---|
| 3,794,984 | 2/1974 | Deerfield et al. | 364/200 |
| 3,875,391 | 4/1975 | Shapiro et al. | 364/736 |
| 3,938,102 | 2/1976 | Morrin et al. | 364/900 |
| 4,090,174 | 5/1978 | Voorhis | 364/900 |

Primary Examiner—David H. Malzahn
Attorney, Agent, or Firm—Birch, Stewart, Kolasch & Birch

[57] ABSTRACT

A one-chip microcomputer system includes an arithmetic and logic unit (ALU) for processing data in an m-bit order. A random access memory is provided, which has a plurality of memory areas each of which is made of m bits. A plurality of memory areas are aligned in the horizontal direction so that the total memory bits in the horizontal direction exceeds n bits. When the row address data and the column address data are applied to an addressing circuit, a desired data of m bits is read out from the random access memory and is applied to the ALU. If only the row address data is applied to the addressing circuit, all data included in a selected row is applied to an output control circuit. The output control circuit latches n bits, whereby n-bit data is developed from the output control circuit to another electronic apparatus.

2 Claims, 6 Drawing Figures

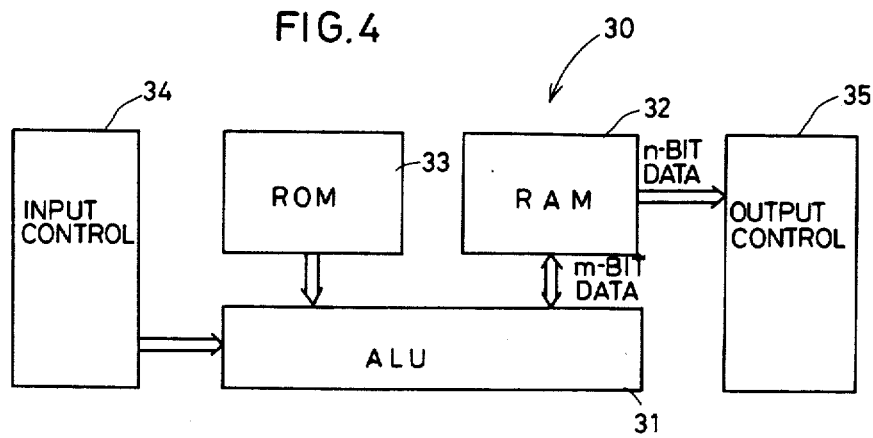
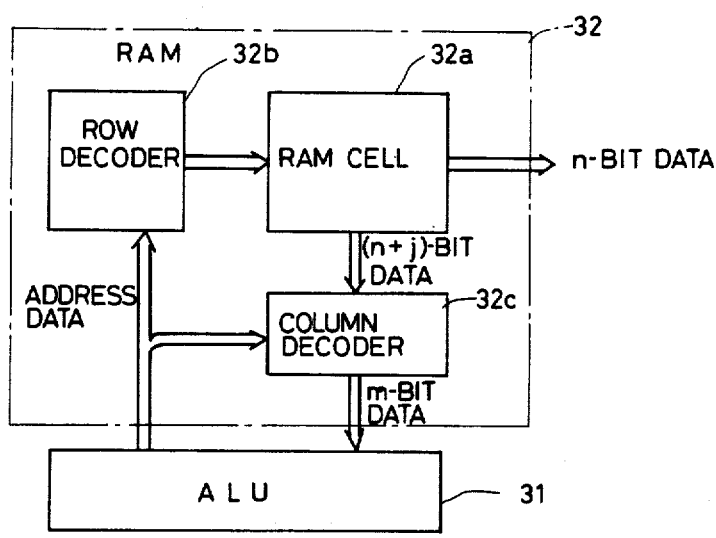
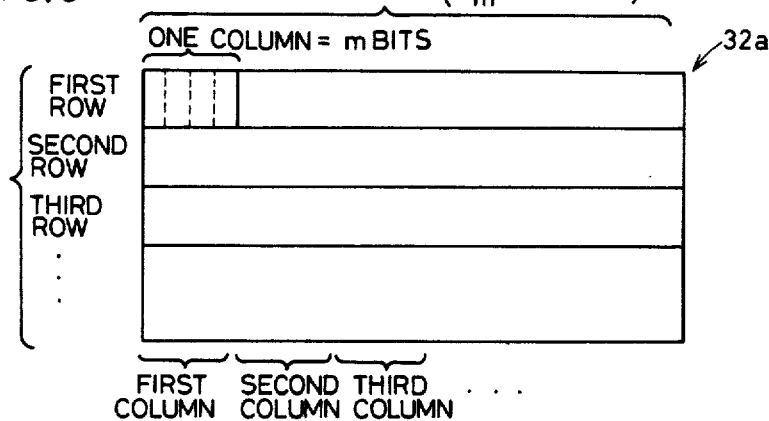

METHOD AND APPARATUS FOR PRODUCING N-BIT OUTPUTS FROM AN M-BIT MICROCOMPUTER

BACKGROUND AND SUMMARY OF THE INVENTION

The present invention relates to a microcomputer system and, more particularly, to a microcomputer system which performs arithmetic processing at the m-bit order and develops an output data signal at the n-bit order, where n is greater than m.

Recently, a one-chip semiconductor microcomputer system has been developed and is widely used in various apparatuses to control the operation of the apparatus. The microcomputer system most widely used is a 4-bit type wherein the arithmetic processing is conducted at the 4-bit order. When the data processed in the 4-bit microcomputer system is desired to be applied to another electronic apparatus which operates at, for example, the 16-bit order, the 4-bit data must be converted to a 16-bit data signal.

Accordingly, an object of the present invention is to provide a microcomputer system which performs the arithmetic processing on m-bit data, and develops an n-bit data signal, where n is greater than or equal to m.

Another object of the present invention is to simplify the data bit conversion in a semiconductor microcomputer system for developing an n-bit output signal while the data processing in the microcomputer system is conducted on m-bit data, where n is greater than m.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a random access memory system is provided for storing the data processed by an arithmetic and logic unit (ALU). The data transfer between the random access memory system and the ALU is conducted at the m-bit order. The random access memory system is connected to an output control system in order to supply an output data signal of n-bit (n is greater than or equal to m) from the ramdom access memory system to the output control system.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 4 is a schematic block diagram of an embodiment of a microcomputer system of the present invention;

FIG. 5 is a block diagram of a random access memory system included in the microcomputer system of FIG. 4; and FIG. 6 is a schematic view showing memory areas in a random access memory included in the random access memory system of FIG. 5.

DESCRIPTION OF THE PREFERRED EMBODIMENTS

Figure 1:
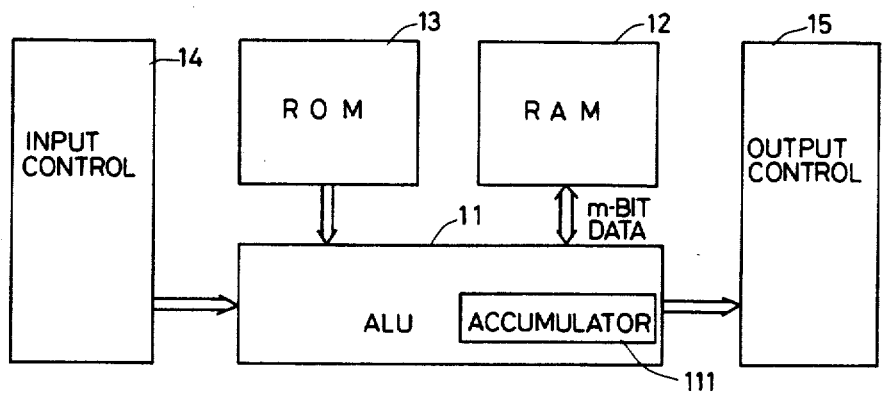
FIG. 1 is a schematic block diagram of a microcomputer system of prior art.

FIG. 1 shows the conventional microcomputer system. The conventional microcomputer system 10 includes an arithmetic and logic unit (ALU) 11, a random access memory (RAM) 12, a read only memory (ROM) 13, an input control circuit 14 and an output control circuit 15. The arithmetic and logic unit (ALU) 11 performs the data processing required in the microcomputer system in the m-bit order. An accumulator 111 is included in the arithmetic and logic unit (ALU) 11 for temporarily storing the calculation result obtained in the arithmetic and logic unit (ALU) 11. The calculation result and the various data processed in the arithmetic and logic unit (ALU) 11 are introduced into and stored in the random access memory (RAM) 12. More specifically, the m-bit data is written into or read out from the random access memory (RAM) 12. The read only memory (ROM) 13 stores the operation program and fixed data for controlling the operation of the microcomputer system 10. The input control circuit 14 functions to supply the arithmetic and logic unit (ALU) 11 with the data received from another data processing apparatus. If required, the data is converted into a suitable data format at the input control circuit 14.

When the calculation result obtained at the arithmetic and logic unit (ALU) 11 or the data read out from the random access memory (RAM) 12 is desired to be supplied to another electronic apparatus, the arithmetic and logic unit (ALU) 11 functions to supply the data to the output control circuit 15. The thus constructed microcomputer system is called an m-bit microcomputer because the data processing in the arithmetic and logic unit (ALU) 11 and the data transfer between the arithmetic and logic unit (ALU) 11 and the random access memory (RAM) 12 are conducted in the m-bit order. When the electronic apparatus to which the data is desired to be applied through the output control circuit 15 requires the n-bit data (n is greater than m), the m-bit data must be converted into the n-bit data at the output control circuit 15.

Figure 2:
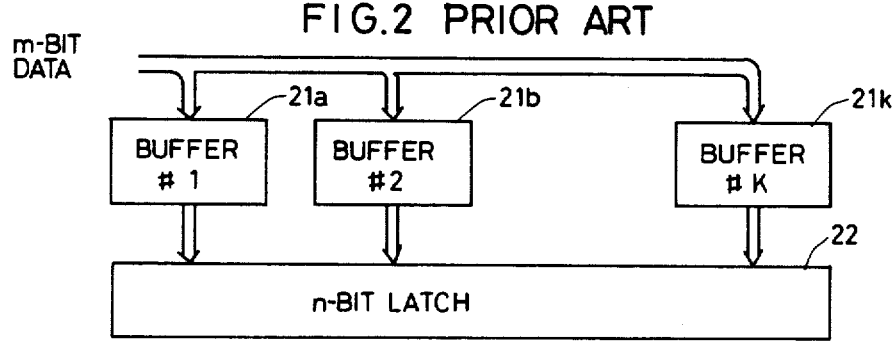
FIG. 2 is a block diagram of an example of a data bit conversion system of prior art for converting m-bit data into n-bit data.
Figure 3:
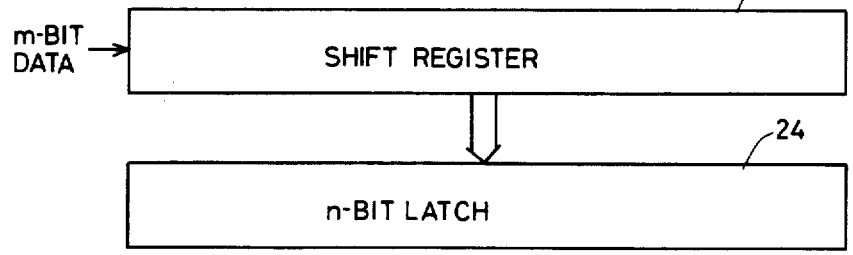
FIG. 3 is a block diagram of another example of a data bit conversion system of prior art for converting m-bit data into n-bit data.

FIGS. 2 and 3 show examples of the data bit conversion system employed in the conventional microcomputer system of FIG. 1 for converting the m-bit data into the n-bit data.

The data bit conversion system of FIG. 2 is included in the arithmetic and logic unit (ALU) 11, or disposed between the arithmetic and logic unit (ALU) 11 and the output control circuit 15. The data bit conversion system of FIG. 2 includes a plurality of buffer registers 21a, 21b, - - - , and 21k, and an n-bit latch circuit 22. Each of the buffer registers 21a, 21b, - - - , and 21k temporarily stores the m-bit data. The n-bit latch circuit 22 functions to latch the data temporarily stored in the buffer registers 21a, 21b, - - - , and 21k in order to develop the n-bit data which is applied to the output control circuit 15. In the example of FIG. 2, n=mk. That is, one byte is made of m bits, and n bits correspond to k bytes.

The data bit conversion system of FIG. 3 is also included in the arithmetic and logic unit (ALU) 11, or disposed between the arithmetic and logic unit (ALU) 11 and the output control circuit 15. The data bit conversion system of FIG. 3 includes a shift register 23 and an n-bit latch circuit 24. The m-bit data is serially applied to the shift register 23 in the series fashion and is temporarily stored in the shift register 23. When the data stored in the shift register 23 becomes n bits, the n-bit latch circuit 24 latches the contents stored in the shift register 23, which are the n-bit data.

The data bit conversion system of FIG. 2 requires a plurality of buffer registers. The data bit conversion system of FIG. 3 requires a shift register. These registers complicate the construction of the microcomputer system. Furthermore, the arithmetic and logic unit (ALU) 11 must control the conversion operation in accordance with the complicated program.

The present invention is to simplify the data bit conversion operation. FIG. 4 schematically shows an embodiment of a microcomputer system of the present invention.

A microcomputer system 30 of the present invention includes an arithmetic and logic unit (ALU) 31, a random access memory system 32, a read only memory 33, an input control circuit 34, and an output control circuit 35. In accordance with the present invention, when the data stored in the random access memory system 32 is desired to be read out and is desired to be applied to the arithmetic and logic unit (ALU) 31, the data is read out in the m-bit order. When the data stored in the random access memory system 32 is desired to be applied to the output control circuit 35, the data is read out from the random access memory system 32 in the n-bit order and is directly applied to the output control circuit 35. The n-bit data is applied from the random access memory system 32 directly to the output control circuit 35, but is not applied to the arithmetic and logic unit (ALU) 31. The output control circuit 35 functions to latch the thus applied n-bit data.

The detailed construction of the random access memory system 32 is shown in FIG. 5. The random access memory system 32 includes a random access memory cell (RAM cell) 32a, a row decoder 32b, and a column decoder 32c. The RAM cell 32a has, as shown in FIG. 6, a plurality of columns, and a plurality of rows. Each column is made of memory cells of m bits. Accordingly, if the RAM cell 32a has (n+j) bits in the horizontal direction, the number of the columns is (n+j)/m, where n (bits)=km (bits).

When the m-bit data stored in the RAM cell 32a is desired to be read out, the row decoder 32b and the column decoder 32c are supplied with address data for selecting a desired memory section consisting of m bits. When the n-bit data is desired to be read out from the RAM cell 32a, in order to supply the n-bit data directly to the output control circuit 35, the row decoder 32b is supplied with the address data, and the column decoder 32c is disabled. As already discussed above, one row in the RAM cell 32a includes (n+j)-bit data. However, the output control circuit 35 latches only the n-bit data, and the remaining j-bit data is neglected. If the RAM cell 32a is constructed to satisfy j=0, the above mentioned neglecting operation must not be conducted by the output control circuit 35.

An operational mode for reading out the m-bit data and the n-bit data from the RAM cell 32a will be described with reference to FIGS. 5 and 6, in detail.

When the m-bit data is desired to be read out, the arithmetic and logic unit (ALU) 31 develops a row address data to the row decoder 32b, and a column address data to the column decoder 32c. In accordance with the row number data included in the row address data, the row decoder 32b selects one row of memory cells included in the RAM cell 32a. The (n+j)-bit data stored in the selected row of the RAM cell 32a is applied to the column decoder 32c. The column decoder 32c functions to select a desired m-bit data from the (n+j)-bit data in accordance with the column number data included in the column address data, whereby the m-bit data is supplied to the arithmetic and logic unit (ALU) 31.

When the n-bit data is desired to be supplied from the RAM cell 32a to the output control circuit 35, the arithmetic and logic unit (ALU) 31 develops a row address data to the row decoder 32b. The address data does not include the column address data. The (n+j)-bit data stored in the selected row of the RAM cell 32a is applied to the output control circuit 35. As already discussed above, the output control circuit 35 latches the n-bit data and neglects the remaining j-bit data.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A microcomputer system comprising:
arithmetic and logic unit means for processing m-bit data;
random access memory means for storing the m bit data having a plurality of memory cells that are aligned in a matrix fashion, the number of said memory cells that are aligned in a first direction being greater than or equal to a bit number n;
output control means for latching n-bit data and receiving the n-bit data, where n is greater than m;
addressing means for selecting desired memory cells in said random access memory means, said addressing means including first address means for selecting desired memory cells along said first direction, and second address means for selecting desired memory cells along a second direction which is different from said first direction in said matrix fashion;
control means includable in said arithmetic and logic unit for selectively enabling said addressing means, whereby m-bit data is read out from the random access memory means and is applied to said arithmetic and logic unit means when both of said first and second address means are enabled, and n-bit data is read out from the random access memory means and is applied to said output control means when said first address means is enabled and said second address means is disabled.

2. A microcomputer system comprising:
arithmetic and logic unit means for processing m-bit data;
output control means for latching n-bit data and receiving tne n-bit data, where n is greater than or equal to m;
random access memory means having at least one memory area in the horizontal direction and a plurality of memory areas in the vertical direction, thereby providing memory areas aligned in a matrix fashion, each of said memory areas having m bits in the horizontal direction, and the total memory bits in said horizontal direction of said random access memory means being greater than or equal to the bit number n;

addressing means for selecting desired memory areas in said random access memory means, said addressing means including;

a row decoder for selecting desired memory areas aligned in said horizontal direction;

a column decoder for selecting desired memory areas aligned in said vertical direction; and control means includable in said arithmetic and logic unit for selectively enabling said addressing means, whereby m-bit data is read out from said random access memory means and is applied to said arithmetic and logic unit means when both the row decoder and column decoder are supplied with address data, and data of which bit number is greater than or equal to n is read out from said random access memory means and is applied to said output control means when said row decoder is supplied with address data and address data is not applied to said column decoder.

* * * * *